(12) United States Patent
Sperber et al.

(10) Patent No.: US 7,882,325 B2
(45) Date of Patent: Feb. 1, 2011

(54) METHOD AND APPARATUS FOR A DOUBLE WIDTH LOAD USING A SINGLE WIDTH LOAD PORT

(75) Inventors: Zeev Sperber, Zichron Yaakov (IL); Robert Valentine, Qiryat Tivon (IL); Ehud Cohen, Kiryat Motskin (IL); Doron Orenstien, Haifa (IL); Benny Eitan, Haifa (IL)

(73) Assignee: Intel Corporation, Santa Clara, CA (US)

( * ) Notice: Subject to any disclaimer, the term of this patent is extended or adjusted under 35 U.S.C. 154(b) by 486 days.

(21) Appl. No.: 11/963,295

(22) Filed: Dec. 21, 2007

(65) Prior Publication Data

US 2009/0164763 A1 Jun. 25, 2009

(51) Int. Cl.
*G06F 12/04* (2006.01)
(52) U.S. Cl. .................. 711/167; 711/168; 711/169; 711/214; 711/215; 712/22; 712/208; 712/210; 712/225
(58) Field of Classification Search .................. 712/225
See application file for complete search history.

(56) References Cited

U.S. PATENT DOCUMENTS

| 5,852,726 | A | 12/1998 | Lin et al. |
| 5,857,096 | A | 1/1999 | Bistry et al. |
| 5,940,859 | A | 8/1999 | Bistry et al. |
| 5,956,753 | A | 9/1999 | Glew et al. |
| 6,463,522 | B1 | 10/2002 | Akkary |
| 6,546,462 | B1 | 4/2003 | Palanca et al. |
| 6,944,745 | B2 | 9/2005 | Parthasarathy |
| 7,047,397 | B2 | 5/2006 | Segelken |
| 7,062,636 | B2 | 6/2006 | Baxter et al. |
| 2002/0144061 | A1* | 10/2002 | Faanes et al. ............... 711/126 |
| 2003/0225998 | A1* | 12/2003 | Khan et al. .................. 712/210 |
| 2004/0205305 | A1* | 10/2004 | Lee et al. .................... 711/149 |
| 2004/0230772 | A1* | 11/2004 | Busaba et al. ............... 712/215 |
| 2004/0230773 | A1* | 11/2004 | Busaba et al. ............... 712/215 |
| 2005/0027964 | A1* | 2/2005 | Sperber et al. ................ 712/24 |
| 2006/0010255 | A1* | 1/2006 | Van Berkel et al. ............ 710/1 |
| 2006/0206693 | A1* | 9/2006 | Segelken ..................... 712/218 |
| 2006/0212685 | A1* | 9/2006 | Raghavan et al. ........... 712/225 |
| 2006/0218377 | A1* | 9/2006 | Boggs et al. ................. 712/200 |
| 2006/0218380 | A1* | 9/2006 | Boggs et al. ................. 712/218 |
| 2006/0218381 | A1* | 9/2006 | Fogg et al. .................. 712/223 |

(Continued)

FOREIGN PATENT DOCUMENTS

EP         651321 A1 *   5/1995

(Continued)

OTHER PUBLICATIONS

SIMD definition; Sci-Tech Dictionary; Sep. 16, 2007.*

(Continued)

*Primary Examiner*—Jack A Lane
(74) *Attorney, Agent, or Firm*—Caroline M. Fleming (57) ABSTRACT

A single micro-instruction to perform either an N-bit or a 2N-bit load is provided. A microprocessor having an N-bit load port performs either an N-bit load or a 2N-bit load in a single cycle with the same micro-instruction being used for both the N-bit and the 2N-bit load.

14 Claims, 4 Drawing Sheets

U.S. PATENT DOCUMENTS

| | | | |
|---|---|---|---|
| 2006/0265576 A1* | 11/2006 | Davis et al. ................. | 712/229 |
| 2006/0271766 A1* | 11/2006 | Vasekin et al. .............. | 712/207 |
| 2007/0079179 A1* | 4/2007 | Jourdan et al. ................ | 714/49 |
| 2007/0101106 A1* | 5/2007 | Senter et al. ................ | 712/225 |
| 2007/0106880 A1* | 5/2007 | Wang et al. ................. | 712/218 |
| 2007/0180006 A1* | 8/2007 | Gyoten et al. ............... | 708/200 |

FOREIGN PATENT DOCUMENTS

| | | | |
|---|---|---|---|
| EP | 679991 A1 | * | 11/1995 |
| JP | 2006350907 A | * | 12/2006 |

OTHER PUBLICATIONS

Exploiting Superword Level Parallelism with Multimedia Instruction Sets; Larsen et al.; ACM SIGPLAN Notices; vol. 35, No. 5; May 2000.*

IPCOM000001283D, Statutory Invention Registration; Hinton et al.; Feb. 1, 1994 (published on IP.com Mar. 30, 2006).*

Microprocessor Types and Specifications, chapter from Upgrading and Repairing PCs, 17th Edition; Scott Mueller; Jul. 21, 2006.*

Efficient Utilization of SIMD Instructions; Franchetti et al.; Proceedings of the IEEE, vol. 90, No. 2; Feb. 2005.*

Compiling for SIMD Within a Register; Fisher et al.; 11th Annual Workshop on Languages and Compilers for Parallel Computing (LCPC98); 1998.*

Computer Architecture: A Quantitative Approach; Hennessy et al.; p. 128; published 2003.*

* cited by examiner

METHOD AND APPARATUS FOR A DOUBLE WIDTH LOAD USING A SINGLE WIDTH LOAD PORT

FIELD

This disclosure relates to computer systems and in particular to execution of instructions by a microprocessor.

BACKGROUND

Single Instruction Multiple Data (SIMD) instructions allow a same instruction to be performed simultaneously on multiple sets of data (a dataset). A SIMD instruction reduces the total execution time compared to performing the same instruction serially on each of the sets of data. SIMD instructions are typically used to accelerate performance in applications including multimedia, video, audio encoding/decoding, 3-Dimensional (3-D) graphics and image processing. For example, Intel Pentium MMX Processors have Streaming SIMD Extension (SSE) instruction sets.

The elements of the dataset are typically stored in a "packed vector", that is, a data structure that includes a plurality of data elements of the same size. Typically, a set of SIMD instructions may operate on either 64-bit dataset or a 128-bit dataset which may be loaded at one time.

An SSE instruction set may include integer instructions that operate on 64-bit or 128-bit datasets and double-precision floating point instructions that allow two floating-point operations to be simultaneously executed providing support for double-precision operations. Double precision operations help accelerate content creation, financial, engineering, and scientific applications.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

The performance of Single Instruction Multiple Data (SIMD) instructions may be further increased by increasing the size of the dataset (multiple sets of data—a plurality of same size data elements for example, a plurality of 16-bit data elements (words)). Increasing the dataset by two, for example, from N-bits to 2N-bits allows a same instruction to simultaneously operate on twice the number of words.

One technique that may be used to support datasets having different sizes is to provide a plurality of different micro-operations for a plurality of different dataset sizes. For example, a micro-operation may be provided to load a dataset having N bits, the same micro-operation may be used to load the low N-bits of a 2N-bit dataset with another micro-operation being provided to load the high-order (upper) N-bits of the 2N-bit dataset (block of data). Thus, two micro-operations are required to load the 2N-bit dataset, one to load the low order N-bits and the other to load the high-order N-bits. However, any increase in the number of micro-operations supported by a microprocessor results in a corresponding increase in area and complexity of the microprocessor.

In an embodiment of the present invention, a 2N-bit Streaming SIMD Extension (SSE) load micro-operation performs a double load by using a single N-bit load port to load 2N bits in one cycle according to the principles of the present invention. The 2N-bit SSE load micro-operation may also perform a load of N-bits in one cycle.

In one embodiment of the present invention a double load 2N SSE micro-operation increases performance of applications executing in a microprocessor having an N-bit architecture for load/store and execution. An embodiment will be described for N equal to 128 (2N equal to 256).

Figure 1:
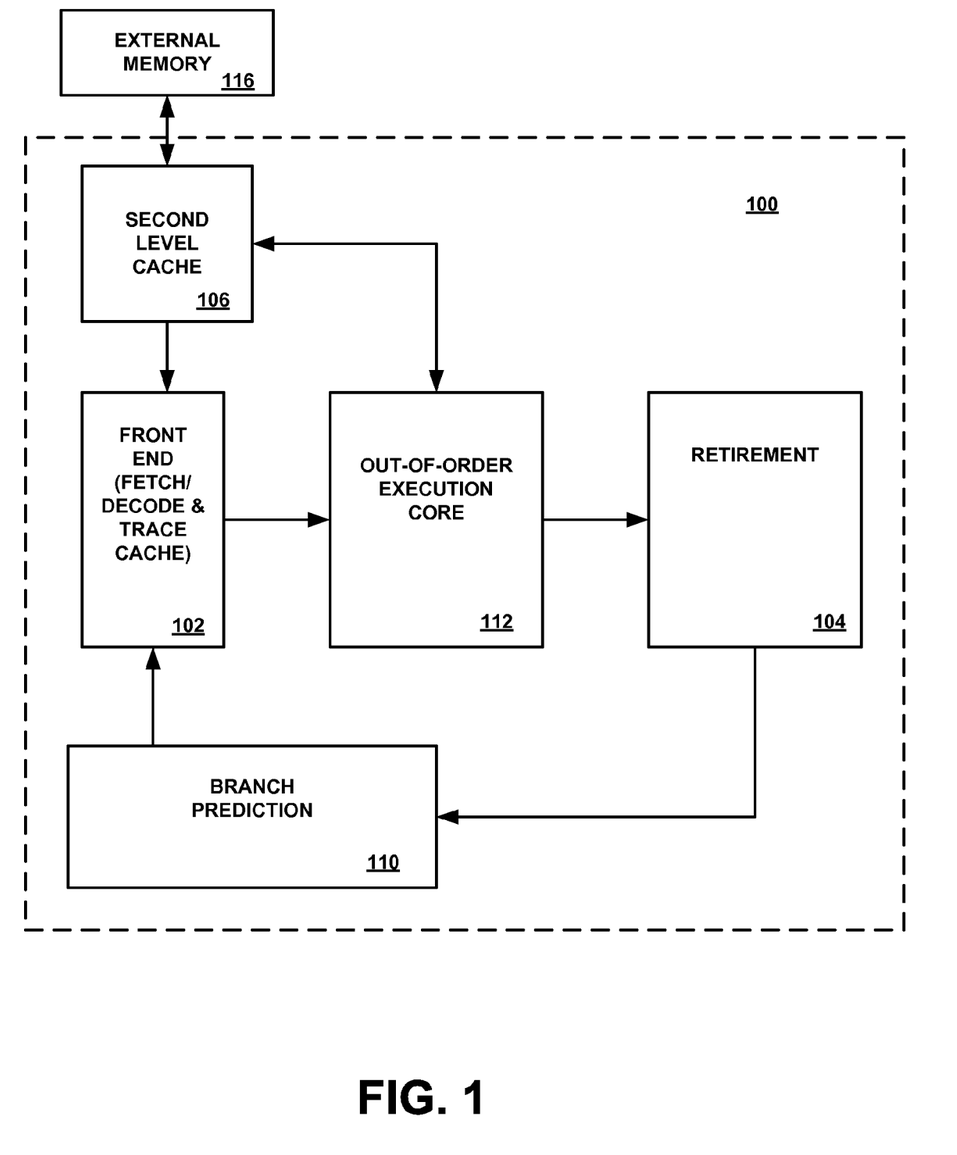
FIG. 1 is a block diagram of an embodiment of a processor that includes an out-of-order execution core.

FIG. 1 is a block diagram of an embodiment of a processor 100 that includes an out-of-order execution core 112. An in-order front end 102 supplies instructions that may be stored in second level cache 108 in program order, to the out-of-order execution core 112. The front end 102 includes a decoder to decode instructions into micro-operations that are then forwarded to the out-of-order execution core 112.

The out-of-order execution core 112 facilitates parallel execution of instructions and may dispatch a plurality of micro-operations per cycle allowing several instructions to be in flight at a time for each of a plurality of pipelines. A retirement unit 104 receives the results of the executed micro-operations from the out-of-order execution core 112 and processes the results. The retirement unit 104 also keeps track of branches and sends updated branch target information to a branch target buffer in a branch prediction unit 110. The Branch Target Buffer purges sequences of micro-operations (traces) fetched and decoded by a translation engine in the front end 102 that are no longer needed.

Figure 2:
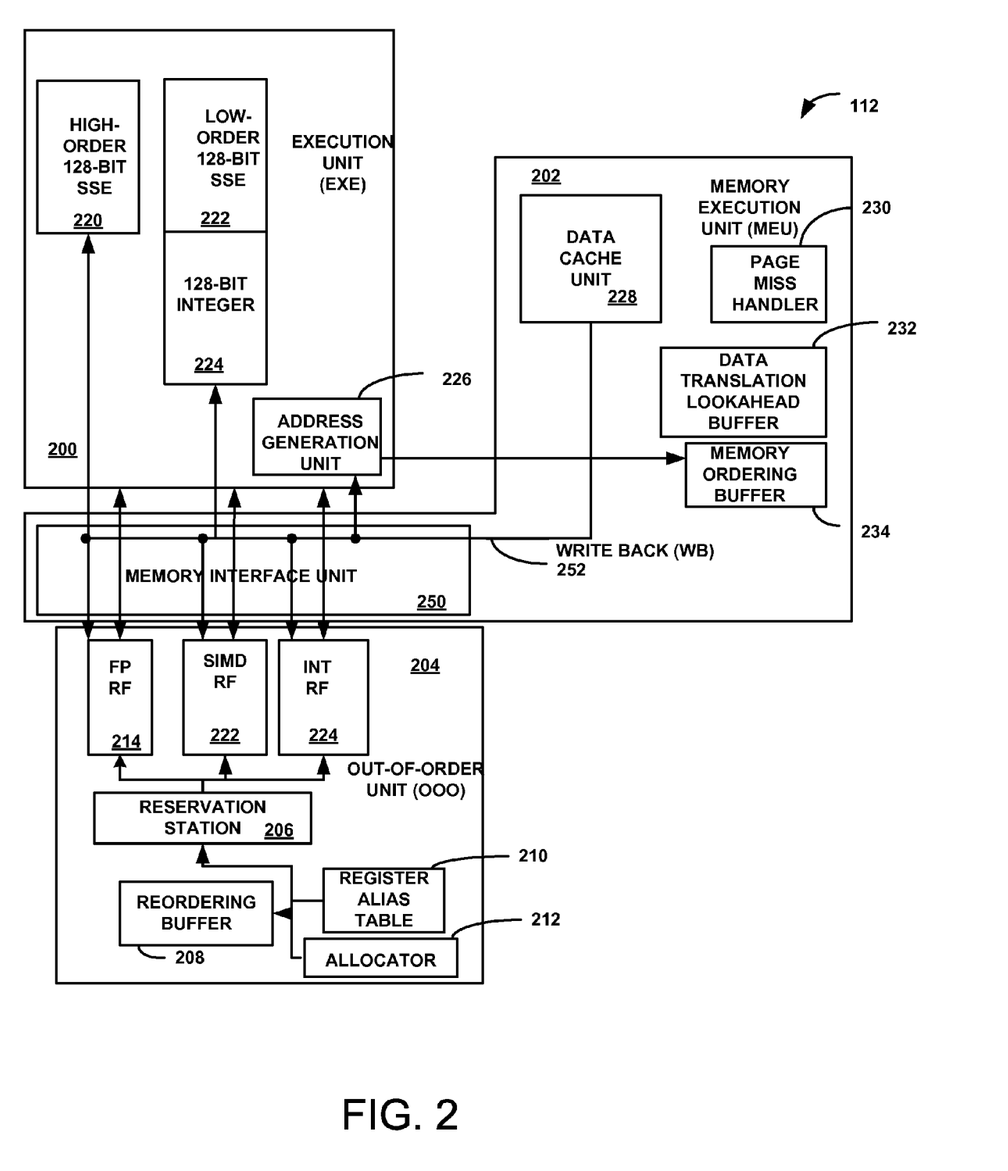
FIG. 2 is a block diagram illustrating an embodiment of the out-of-order execution core shown in FIG. 1.

FIG. 2 is a block diagram illustrating an embodiment of the out-of-order execution core 112 shown in FIG. 1. The out-of-order execution core 112 includes an execution unit 200, an out-of-order (OOO) unit 204 and a memory execution unit (MEU) 202.

The processor 100 may perform an operation using a single 256-bit SSE load micro operation in the out-of-order execution unit 204 and the execution unit 200. The 256-bit SSE load is implemented as a single 256-bit load operation from the point of view out of order unit 204 that is later split into two 128-bit load operations. The execution unit 200 sees the load as a single 256-bit load operation.

Instructions may be executed in an order other than that which appears in a computer program. A re-ordering buffer 208 in the out-of-order unit 204 reorders micro-operations decoded by the decoder in the front end 102 to yield the sequence of instructions specified by the computer program.

The memory execution unit 202 executes instructions that involve memory accesses such as load and store instructions. The memory execution unit 202 includes a Data Cache Unit (DCU) 228, a Memory Ordering Buffer (MOB) 234, a Page Miss Handler (PMH) 230, a Data Translation Lookaside Buffer (DTLP) 232 and a memory interface unit (MIU) 250. The data cache unit 228 is a first level data cache. The translation lookaside buffer 232 maintains a cache of address translations between linear addresses and corresponding physical addresses. In the event that a translation between a linear address and a physical address is not cached within the translation lookaside buffer 232, the page miss handler 230 performs a page table walk to determine the corresponding physical addresses.

The memory ordering buffer 234 controls memory accesses to the data cache unit 228. More specifically, the memory ordering buffer 234 maintains lists (not shown) of memory loads and stores. The memory ordering buffer 234 checks the lists of loads and stores for possible adverse memory effects and reorders the memory access operations in the lists accordingly. The memory ordering buffer 234 may postpone execution of particular memory access operations until ordering problems are resolved.

The data cache unit 228 includes internal cache lines maintaining data for many of the most recently accessed memory locations. The data cache unit 228 may be, for example, a write-back cache or a write-through cache or may be configured to implement a variety of cache protocols. If data for a load instruction is not found within the data cache unit 124, a memory request is issued to external memory 116 to access the data specified by the load instruction. The external memory 116 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The out-of-order unit 202 includes a reservation station (RS) 206, a reordering buffer (ROB) 208, a register alias table 210, an allocator 212, and three register files (RF): a floating point register file 214, a SIMD register file 216 and an integer register file 218.

The reservation station 206 queues micro-operations until all source operands are ready and dispatches micro-operations to available execution units including execution unit 200 and memory execution unit 202.

The register alias table 210 maps architectural registers into physical registers, for example, architectural register EAX may be mapped to physical register 12 hexadecimal). The allocator 212 allocates load and store buffers in the memory ordering buffer 234 and also assigns each micro-operation an entry in the memory ordering buffer 234, the reservation station 206 and the reordering buffer 208. An address generation unit (AGU) 226 computes linear addresses for micro-operations that access memory such as micro-operations that retrieve (load) data from memory or store data to memory.

The execution unit 200 includes three 128-bit execution stacks. The execution stacks include a high-order 128-bit SSE stack 220, a low-order 128-bit SSE stack 222 and a 128-bit SSE integer stack 224. The 128-bit SSE integer stack 224 is connected to the low-order 128-bit SSE stack 222. A single 128-bit or 256-bit SSE operation would in 128-mode use the low-order 128-bit stack. A single 128-bit or 256-bit SSE operation would in 256-bit mode use both the low-order 128-bit stack and the high-order 128-bit stack. The execution stacks in the execution unit 200 will be described for use with a SSE instruction set. The use of the execution stacks by instructions other than instructions in the 256-bit SSE instruction set is beyond the scope of the present invention.

The execution stacks 220, 222 in the execution unit 200 are arranged such that the 128-bit low-order stack 222 is the closest to the data cache unit 228 and the 128-bits high-order stack 220 is located further away from the data cache unit 228.

Thus, there is a latency of one pipe cycle for the data from the data cache unit 228 in the memory unit 202 to reach the high-order 128-bit SSE stack 220 in addition to the latency for the data to reach the low-order 128-bit SSE stack 222.

In an embodiment, an architectural register XMM is used to identify a 128-bit operation executed into a 256-bit register and an architectural register YMM is used to identify a 256-bit operation executed into a 256-bit register. As discussed earlier, the register alias table 210 is used to translate an architecture register to a physical register in the processor 100. For backward compatibility with 128-bit SSE instructions that use 128-bit XMM architectural registers, the 128-bit XMM registers are mapped (aliased) to the 128 low-order bits (bits127:0) of the 256-bit YMM registers.

The set of 256-bit SSE instructions may have different modes of operation that affect how data is stored in the YMM registers. In an embodiment, the modes of operation include a 128-bit mode and a 256-bit mode. In both modes, 256-bits are written to a YMM register in the physical register file.

In a 128-bit mode of operation an operation is performed on a 128-bit dataset, the result is stored in the low-order 128-bits of the YMM register and zero is written to the high-order 128-bits of the YMM register in a physical register file. The zero may be written to the upper 128-bits of the YMM register or instead a bit indicating that the upper bits are cleared can be set in the Register Alias Table (RAT). In another embodiment, the low-order 128-bits of the YMM register are replaced with the final value using a blend micro-operation that follows the load to the high-order 128-bits of the YMM register. In 256-bit mode an operation is performed on a 256-bit dataset and the 256-bit result is stored in a 256-bit YMM register in the physical register file.

Figure 3:
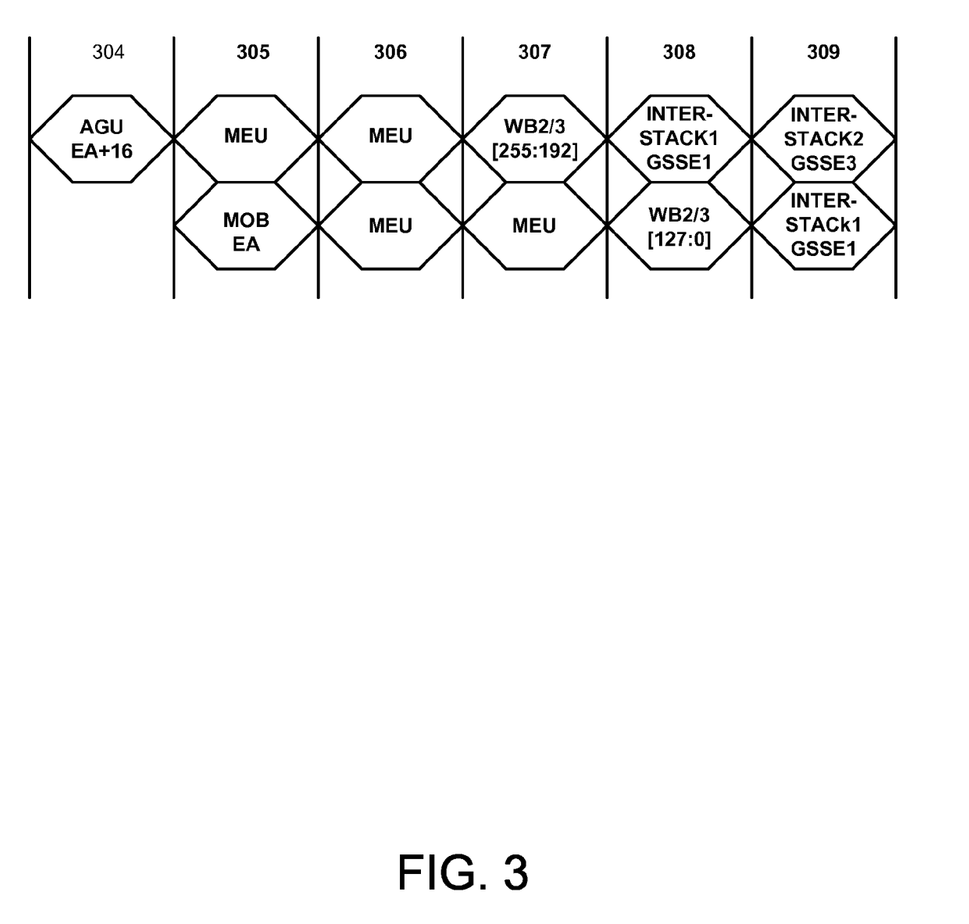
FIG. 3 illustrates an embodiment of load pipe stages for a 256-bit SSE load.

FIG. 3 illustrates an embodiment of stages in a pipeline for a 256-bit SSE load instruction. A 256-bit SSE load instruction (that is, a load of 32 bytes (256-bits)) is defined as a single atomic operation. The 256-bit SSE load instruction is translated into a single micro-operation (µop) produced by a decoder in the front end 102.

The 256-bit SSE load instruction which may either operate on a 256-bit dataset or a 128-bit dataset is decoded by the decoder in the front end 102 to provide a single micro-operation for a 128-bit microprocessor architecture. The micro-operation includes an indication of dataset width, that is, either 128-bits or 256-bits. In an embodiment, a single bit in the micro-operation is used to identify the width. If the width indication is 128-bits, the micro-operation results in a load of 128-bits from the data cache unit 228 to the 128-bit low-order SSE stack 220. If the width indication is 256, the micro-operation results in a load of 256-bits from the data cache unit 228, with the low-order 128-bits loaded in the 128-bit low order SSE stack and the high-order 128-bits loaded in the 128-bit high-order stack. Both the 128-bit load and the 256-bit load are performed in two successive single cycle operations using two successive single (128-bit) load ports.

A single load buffer is allocated in the memory execution unit 202 for either a load of a 128-bit data block or a 256-bit data block. The 256-bit SSE load micro operation allocates a single entry in the reservation station 206 and a single entry in the reordering buffer 206 for normal and fused micro-operations as performed for 128-bit SSE micro-operations.

The 256-bit SSE load micro-operation is then written into the reservation station (RS) 206 in the out-of-order unit 204. The 256 SSE load micro-operation is dispatched by the reservation station 206 as a single micro-operation by the out-of-order unit 204 to the address generator unit 226. In the embodiment shown in FIG. 3, the 256-bit dataset is stored in the data cache unit 228, that is, there is no access to external memory 116 (FIG. 1).

The memory execution unit 202 splits the single load micro-operation into two successive cycles that run on the same load port and return a high-order 128-bit data block and a low-order 128-bit data block. The memory ordering buffer 234 in the memory execution unit 202 splits the 256-bit SSE load micro-operation, for example, a "ld256" micro-operation into two separate 128-bit loads: first the high-order 128-bits (bits 255:128) and then the low-order 128-bits (bits 127:0) of the 256-bit dataset. The memory ordering buffer 234 sends the high-order 128-bits and the low-order 128-bits to the execution unit in back to back pipe stages (cycles). Thus, changes to the memory execution unit 202 and out-of-order unit 204 are minimized with the path to the memory being 128-bits per load port. The high address for the high-order 128-bit chunk (data block) is generated by the Address Generation Unit (AGU), then the Memory Ordering Buffer (MOB)\generates the address of the low-order 128-bit chunk. If the load is not accepted for immediate execution from the Reservation Station (RS) into the cache ("bypass"), the Memory Ordering Buffer stores the high address in the load buffer and then produces the address of the low-order 128-bit chunk.

Although there are two sequential 128-bit operations, there is only a single valid indication used for 256-bit loads. The reservation station 206 only uses the valid indication of the second 128-bit operation and ignores the valid bit in the first 128-bit operation. The single combined valid and fault indication sent together with the low-order 128-bits are also transferred to the reordering buffer 208 to be used at retirement. Any faults collected by the memory reordering buffer 208 are issued for the second 128-bit operation.

In addition, a load cycle for either 128-bit SSE or 256-bit SSE operations occupies a single entry in a load buffer in the memory ordering buffer 234. A load for either 128-bit SSE or 256-bit SSE is dispatched to the same 128-bit load port in the execution unit 200. A single load operation to perform a 256-bits fetch requires two consecutive 128-bits fetch cycles to be executed by the memory execution unit 202.

The low-order 128-bits and the high-order 128-bits of the 256-bit data block are sequenced one after the other and received by the execution unit 200 on the two separate execution stacks 220, 222 in the same cycle. To synchronize the data received by the execution stack such the high-order 128-bit chunk is dispatched first and then the low-order 128-bit chunk is dispatched second. Although the low-order 128-bit chunk and the high-order 128-bit chunk are sequenced one after the other in separate cycles, the low-order 128-bit chunk and the high-order 128-bit chunk are received by the execution unit 200 in the same cycle. This is due to the additional latency of one pipeline cycle delay between the data cache unit 228 and high-order 128-bit execution stack 220 which does not occur between the data cache unit 228 and the low-order 128-bit SSE stack 222.

Referring to FIG. 3, at load pipe stage 304, the address generator unit 226 calculates the address (Effective Address (EA)+16) of the high-order 128-bits (16 bytes) of the 256-bit dataset for the 256-bit SSE load micro-operation. A value of +16 bytes is added to the displacement chunk (over the immediate bus) of the address in the memory interface unit 259 and the value is sent to the address generation unit 226. The address generation unit 226 checks the limit of the complete 256-bit access.

The address generation unit 226 calculates all fault information required for the requested 128-bits or 256-bits (16 or 32 bytes), for example, segment limit and canonical and alignment checks and sends the fault information to the memory execution unit (MEU) 202. The memory execution unit 202 checks for canonical violations.

The address of the high-order 16-bytes (128-bits) is sent to the memory ordering buffer 234 in the memory execution unit 202 where it is stored with the 256-bit SSE load micro-operation in an appropriate load buffer.

At load pipe stages 305 and 306, the memory execution unit performs a memory access in the data cache unit 228 using the address of the high-order 128-bits of the dataset provided by the address generation unit 226.

At load pipe stage 305, the memory ordering buffer 234 calculates the address of the low-order order 16-bytes of the 256-bit dataset by subtracting 16 (bytes) from the address of the high-order 128-bits of the dataset provided by the address generation unit 226 to compute the address in memory at which the low-order 128-bits of the dataset are stored.

At load pipe stages 306 and 307, the memory execution unit 202 performs a read memory access to the data cache unit 228 to retrieve the low-order order 16 bytes of the 256-bit dataset using the address computed by the memory ordering buffer.

At load pipe stage 307, the high order 16 bytes read from data cache unit 228 by the memory execution unit 202 are forwarded to the execution unit 202 on a 128-bit load write-back (WB) bus 252.

At load pipe stage 308, the high order 128 bit of the 256-bit dataset approach the low-order stack 222 and the low-order order 128-bits read from the data cache unit 228 by the memory execution unit 202 are forwarded to the execution unit 202 on a 128-bit load write-back (WB) bus 252.

At load pipe stage 309, the high-order 16 loaded bytes (bits [255:128]) approach the high-order stack 220 and the low-order order 128 bits (bits [127:0]) approach the low-order stack 222. The execution unit 200 performs 256-bit wide operations by operating on a 256-bit block of data stored in two 128-bit execution stacks. Thus, the 256-bit SSE load micro-operation may be regarded as performing two iterations of the corresponding 128-bit SSE in a single clock cycle. Most operations may be performed within a 128-bit portion of the 256-bit data block. Thus, only a small fraction of the operations may involve crossing a 128-bit boundary.

At load pipe stage 310, the physical register file is updated with the 256-bit load data.

The reservation station 206 in the out-of-order execution unit 204 may dispatch another single 256 bit load micro-operation immediately following the first 256-bit load micro-operation. In this case the memory ordering buffer 208 stores the address in the load buffer in the memory ordering buffer 234 and dispatches the 256-bit load micro-operation when it is selected by memory ordering buffer schedule logic.

Thus, as shown in FIG. 3, it takes four clocks (load pipe stages) to deliver the low-order 128-bits of the 256-bit dataset to the low-order 128-bit stack 222 in the execution unit 200 and five clocks (load pipe stages) to deliver the high-order 128-bits of the 256-bit dataset to the high-order 128-bit stack 220 in the execution unit 200. Due the additional one clock latency in the arrival of the high-order 128-bits at high-order 128-bit stack 220 in the execution unit 200, both the high-order 128-bits and the low-order 128-bits are executed in the same clock. Normal operation is executed on the two stacks at the same clocks. The 256-bit data value is read from the physical register file at the same clock and are executed simultaneously on the same clock by the execution unit 200 on the low-order 128-bit stack 222 and on the high-order 128-bit stack 220.

The 256-bit SSE load micro-operation is retired in the same way as other micro-operations because there is a single valid bit for the two sequential 128-bit operations in the reordering buffer 208.

Figure 4:
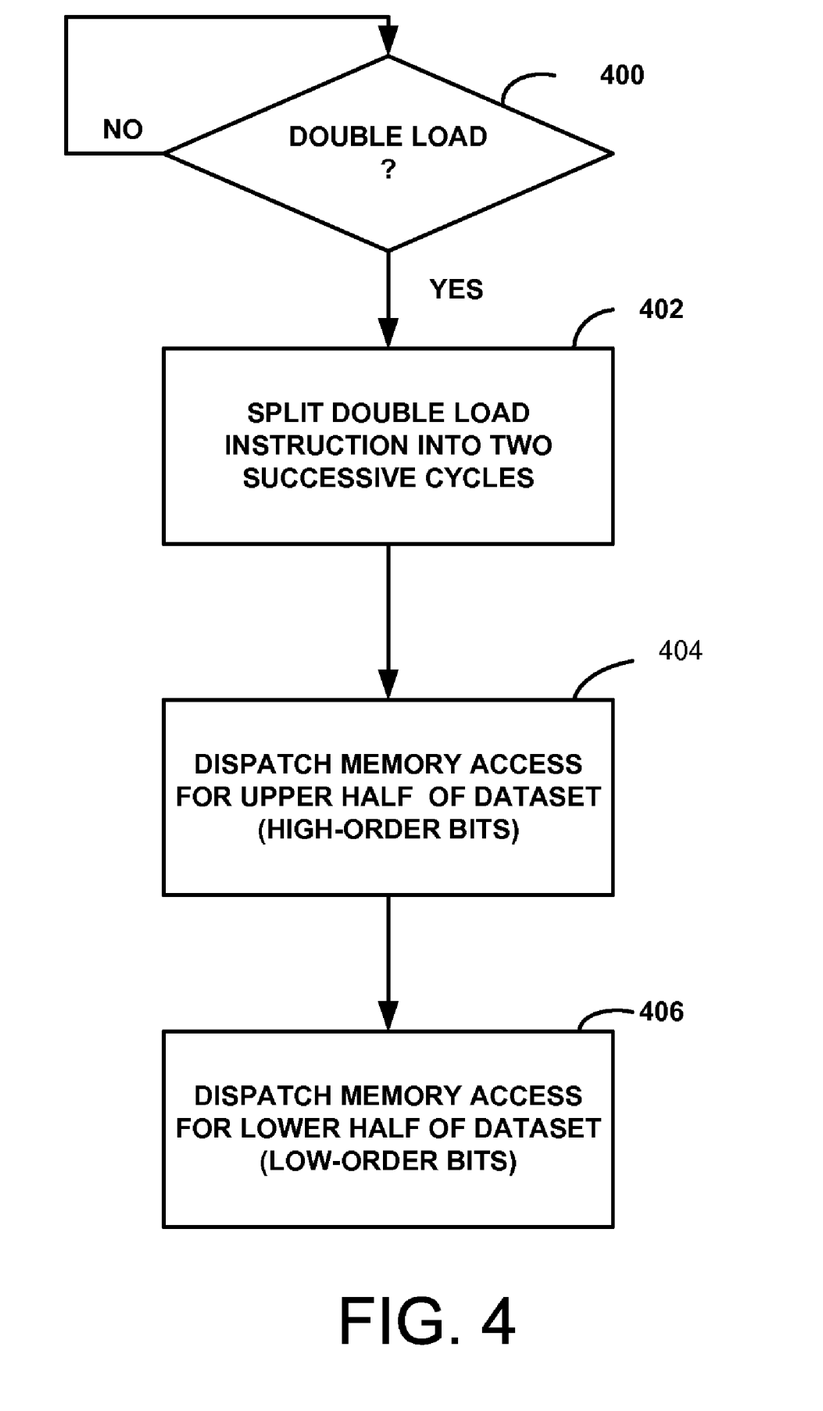
FIG. 4 is a flowgraph illustrating operations performed in a memory execution unit for processing a double load instruction according to the principles of the present invention.

FIG. 4 is a flowgraph illustrating operations performed in a memory execution unit 202 for processing a double load instruction according to the principles of the present invention. FIG. 4 will be discussed in conjunction with FIG. 2.

At block 400, the memory execution unit 202 receives a double load micro-instruction from the reservation station 206 to load a 256-bit dataset from memory to a 256-bit register for use by an execution unit 200. The double load instruction includes an address in memory for the high-order 128-bits of the 256-bit dataset. Processing continues with block 402.

At block 402, the memory execution unit 202 translates the single micro-operation into two successive cycles that run on the same 128-bit load port and return the high-order 128-bits of the 256-bit dataset and the low-order 128-bits of the 256-bit dataset. Processing continues with block 404.

At block 404, to synchronize the 256-bit dataset such that the high-order 128-bits and the low-order 128-bits that are sequenced one after the other are received by the execution unit on the two stacks 220, 222 at the same time, the high-order 128-bits of the 256-bit dataset read from memory is dispatched first to the execution unit 200. Processing continues with block 406.

At block 406, in the next successive load pipe stage, the low-order 128-bits of the 256-bit dataset are dispatched to the execution unit 200. In this manner both the low-order 128-bits and the high-order 128-bits are received by the execution unit 200 at the same time.

The single micro-operation for the 256-bit SSE load is handled the same as any other single micro-operation. For example, the 256-bit SSE load instruction retires in the same way as other 128-bit micro-operations because there is a single valid bit for the micro-operation in the register alias table 210. Also, only a single fault is saved for the 256-bit SSE load instruction by the reordering buffer 208. The two 128-bit load micro-operations issued by the memory ordering buffer experience the same faults in the data translation lookaside buffer 232 and the data cache unit 228. The address generation unit fault and memory ordering buffer fault are combined and sent to the re-ordering buffer 208 on a successful dispatch.

Thus, for a 256 SSE load, two successive memory cycles are performed to fetch the 256-bytes stored in memory, a first memory cycle to fetch the high-order 128-bits and a second memory cycle to fetch the low-order 128-bits. Both the high-order 128-bits and the low-order 128-bits of the 256-bit dataset are delivered to the execution unit 200 at the same load pipe cycle allowing the 256-bit dataset to be operated on in a same pipe cycle.

The increase in the width of the dataset from 128-bits to 256-bits may increase performance of some kernels by up to a factor of two. Thus, many floating point imaging, audio, physics, financial and scientific applications may realize greater than fifty percent performance increase on hand tuned kernels and greater than twenty percent increase when compiled by auto-vectorized compilers.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
   an execution unit; and
   a memory execution unit to perform a load of a 2N-bit dataset from memory to the execution unit in a single cycle using an N-bit load port in response to an instruction to load the 2N-bit dataset encoded in a single micro-operation, the memory execution unit to translate the single micro-operation into two consecutive memory access cycles, a first memory access cycle to retrieve the high-order N-bits of the 2N-bit dataset at Effective Address (EA)+16, a second memory access cycle to retrieve the low-order N-bits of the 2N-bit dataset at EA, and concurrently loading the high-order N-bits of the 2N-bit dataset into a high-order execution stack and the low-order N-bits of the 2N-bit dataset into a low-order execution stack in the execution unit in the single cycle.

2. The apparatus of claim 1, wherein the memory execution unit to perform a load of an N-bit dataset in response to a request to load the N-bit encoded in the single micro-operation.

3. The apparatus of claim 2, wherein the N-bit dataset is loaded in the low order N-bits of a 2N-bit register.

4. The apparatus of claim 1, wherein N is 128.

5. The apparatus of claim 1, wherein the execution unit comprises a high-order stack to store the high-order N-bits of the 2N-bit dataset and a low-order stack to store the low-order N-bits of the 2N-bit dataset, the low-order stack closer to the memory execution unit than the high-order stack.

6. A method comprising:
   determining a load transfer size encoded in a single micro-operation;
   for a load transfer size of 2N, performing a load of a 2N-bit dataset from memory to an execution unit in a single cycle using an N-bit load port;
   translating the single micro-operation into two consecutive memory access cycles, a first memory access cycle to retrieve the high-order N-bits of the 2N-bit dataset at Effective Address (EA)+16, a second memory access cycle to retrieve the low-order N-bits of the 2N-bit dataset at EA; and
   concurrently loading the high-order N-bits of the 2N-bit dataset into a high-order execution stack and the low-order N-bits of the 2N-bit dataset into a low-order execution stack in the execution unit in the single cycle.

7. The method of claim 6, further comprising:
   for a load transfer size of N, performing a load of an N-bit dataset from memory to the execution unit in the single cycle.

8. The method of claim 7, wherein the N-bit dataset is loaded in the low order N-bits of a 2N-bit register.

9. The method of claim 6, wherein N is 128.

10. The method of claim 6, wherein the execution unit comprises a high-order stack to store the high-order N-bits of the 2N-bit dataset and a low-order stack to store the low-order N-bits of the 2N-bit dataset, the low-order stack closer to the memory execution unit than the high-order stack.

11. An article including a computer usuable medium having associated information, wherein the information, when accessed, results in a machine performing:
- determining a load transfer size encoded in a single micro-operation;
- for a load transfer size of 2N, performing a load using an N-bit load port of a 2N-bit dataset from memory to an execution unit in a single cycle;
- translating the single micro-operation into two consecutive memory access cycles, a first memory access cycle to retrieve the high-order N-bits of the 2N-bit dataset at Effective Address (EA)+16, a second memory access cycle to retrieve the low-order N-bits of the 2N-bit dataset at EA; and
- concurrently loading the high-order N-bits of the 2N-bit into a high-order execution stack and the low-order N-bits of the 2N-bit into a low-order execution stack in the execution unit in the single cycle.

12. The article of claim 11, further comprising:
- for a load transfer size of N, performing a load of an N-bit dataset from memory to the execution unit in the single cycle.

13. A system comprising:
- dynamic random access memory;
- an execution unit; and
- a memory execution unit to perform a load of a 2N-bit dataset from memory to the execution unit in a single cycle using an N-bit load port in response to an instruction to load the 2N-bit dataset encoded in a single micro-operation, the memory execution unit to translate the single micro-operation into two consecutive memory access cycles, a first memory access cycle to retrieve the high-order N-bits of the 2N-bit at Effective Address (EA)+16, a second memory access cycle to retrieve the low-order N-bits of the 2N-bit dataset at EA, and concurrently loading the high-order N-bits of the 2N-bit dataset into a high-order execution stack and the low-order N-bits of the 2N-bit dataset into a low-order execution stack in the execution unit in the single cycle.

14. The system of claim 13, wherein the memory execution unit to perform a load of an N-bit dataset in response to a request to load the N-bit dataset encoded in the single micro-operation.

* * * * *